Figure 1:
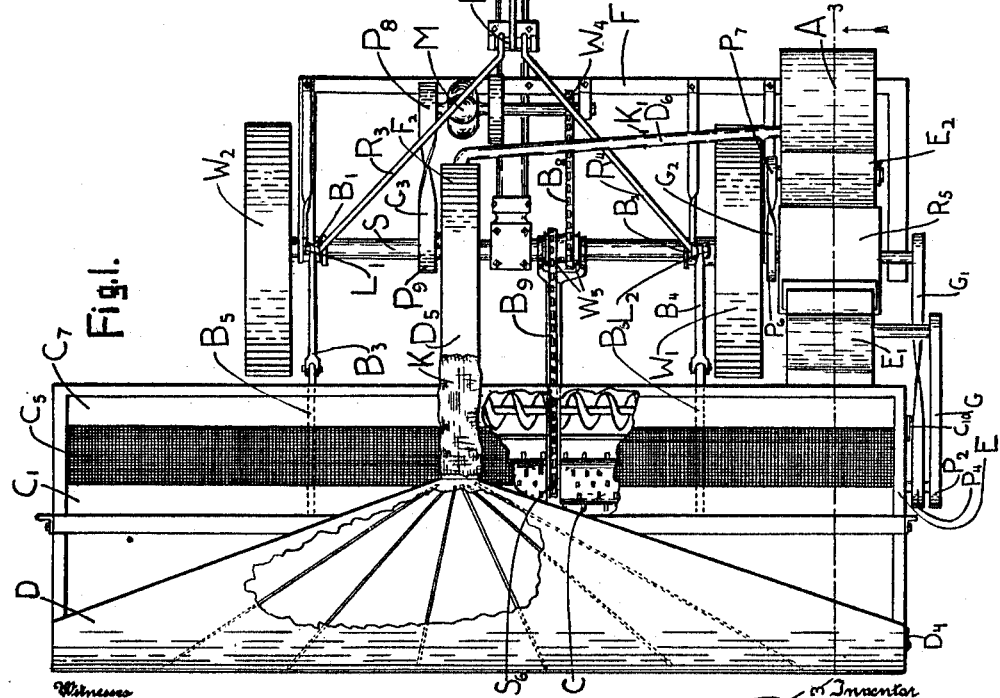

C. C. BALDWIN.
STANDING GRAIN THRESHER.
APPLICATION FILED AUG. 23, 1910.

1,004,134.

Patented Sept. 26, 1911.

3 SHEETS—SHEET 1.

UNITED STATES PATENT OFFICE.

CURTIS C. BALDWIN, OF NICKERSON, KANSAS.

STANDING-GRAIN THRESHER.

1,004,134.          Specification of Letters Patent.     Patented Sept. 26, 1911.

Application filed August 23, 1910. Serial No. 578,528.

*To all whom it may concern:*

Be it known that I, CURTIS C. BALDWIN, a citizen of the United States, residing at Nickerson, in the county of Reno and State of Kansas, have invented a new and useful Standing-Grain Thresher, of which the following is a specification.

The object of this invention is to combine the operations of harvesting and threshing small grain, as wheat, oats and the like from the standing stalks, thus avoiding the useless labor of handling the straw a number of times and diminishing the danger of losses incident to present methods of treatment, such as fermentation in the shock or stack on account of exposure to moisture.

I am aware of the fact that attempts have been made to attain the above object by the use of machines which in a general way appear to resemble my own, but in view of the great demand for such a machine, I am of the opinion that none capable of successful operation is on the market today.

In its present form my invention comprises a carriage of the type well known in connection with the class of reaping machines known as headers, upon which the other parts are mounted; a stripping cylinder arranged near the front of said carriage so as to be brought into contact with the heads of standing grain; a pneumatic or blast device delivering air against said cylinder in such a direction as to cause an entraining action upon the outside air, the heads being first moved toward the cylinder by the entrained air and then driven positively against it by the direct action of the blast; a screw conveyer at the rear of the cylinder for receiving the material from the cylinder; an elevator receiving the grain from the screw conveyer; a threshing device for completing the work begun by the first named cylinder; a cleaner for removing the chaff; an elevator for conveying the material from the thresher to the cleaner; and a gasolene engine for actuating the entire threshing mechanism.

The principal features of my invention are found in the combination with a standing-grain threshing mechanism of a lightweight motor of sufficient power to actuate the same, and in the combination of the blast device and cylinder and parts coacting therewith, by which the heads of the grain are successfully and efficiently gathered and threshed. Parts of the machine which are common in the art and the nature of which is readily seen from the drawings are not described in detail.

Figure 2:
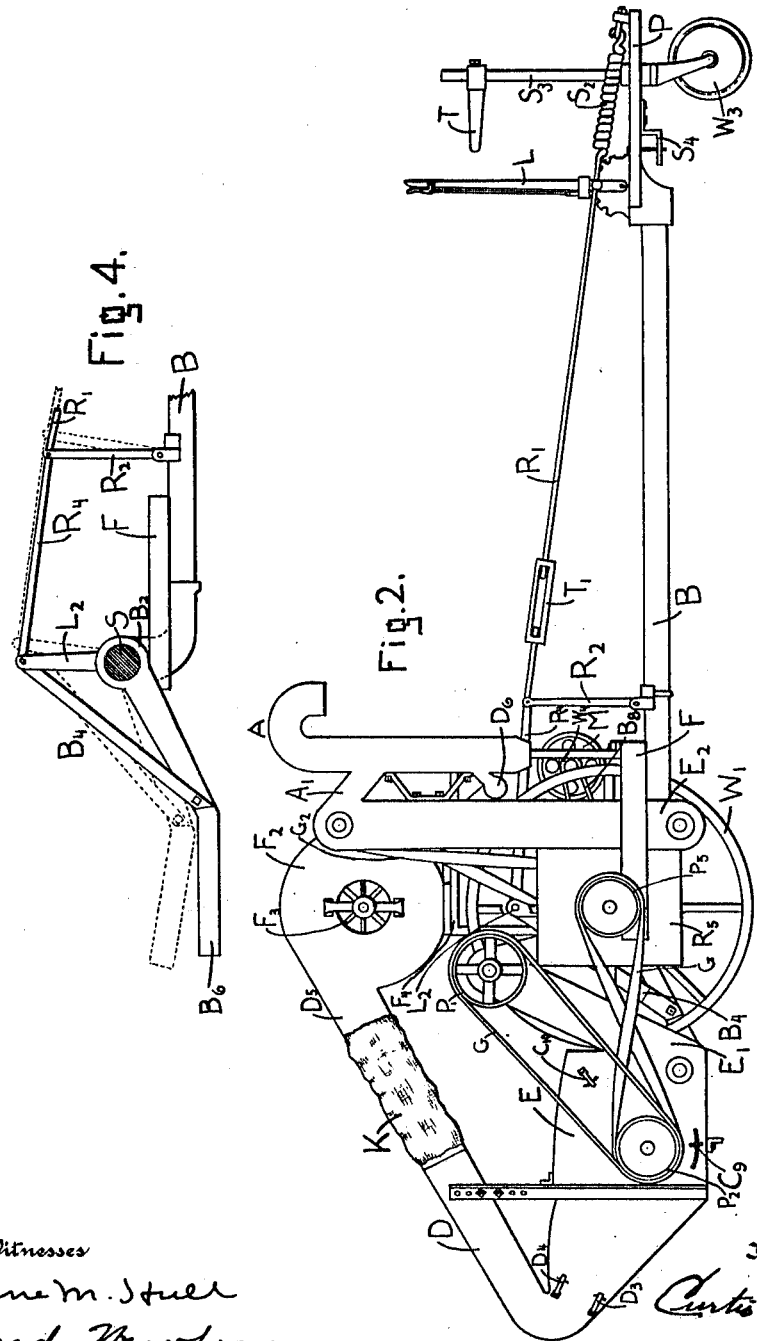
Figure 3:
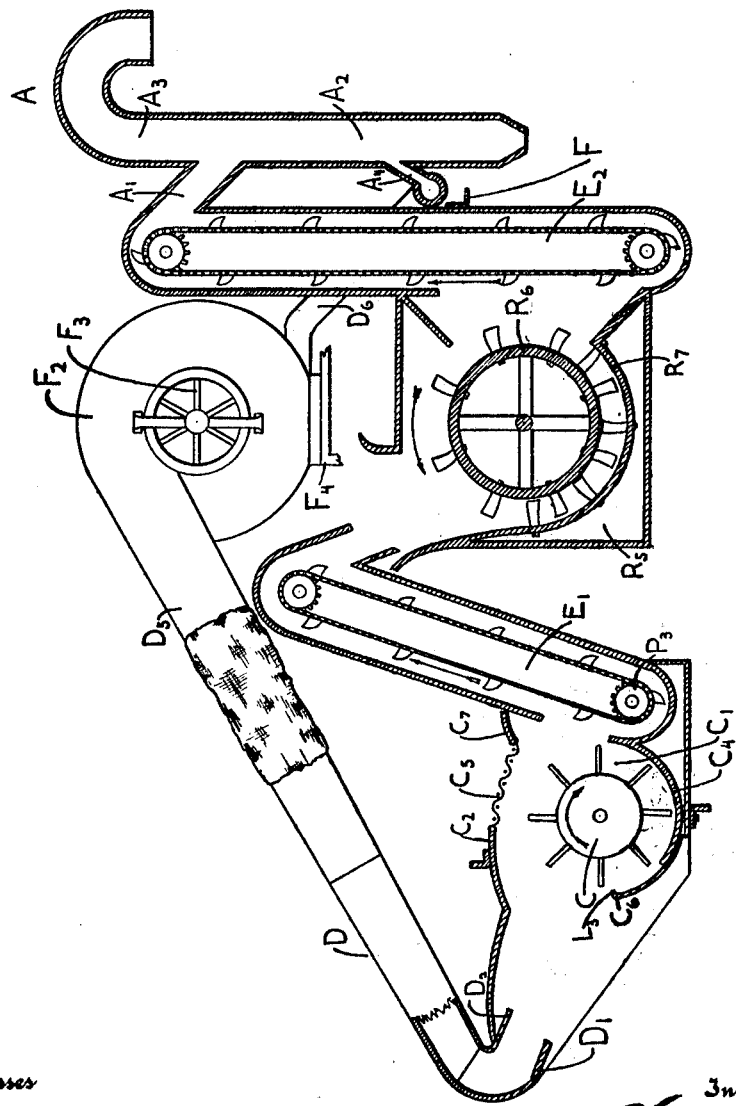

In the drawings illustrating the present embodiment of the invention,—Figure 1 is a top plan view of the machine, parts of the casings being broken away; Fig. 2 is a side elevation of the machine; Fig. 3 is a section on line 3—3 of Fig. 1 viewed in the direction of the arrow, on a slightly enlarged scale; Fig. 4 is an elevation on an enlarged scale of a portion of the frame work of the machine, one position to which certain parts may be adjusted being shown in dotted lines; Fig. 5 is a sectional view on line 5—5 of Fig. 6 viewed in the direction of the arrow, one section of the cylinder being omitted; Fig. 6 is a fragmentary plan view of the central portion of the primary cylinder and associated parts; Fig. 7 is a view of the double sprocket wheel on an enlarged scale.

The motor and in some instances other parts whose details constitute no part of my invention are diagrammatically shown in the drawings.

The carriage comprises essentially a frame F in which is fixed a main shaft S on which shaft the main supporting wheels $W_1$ and $W_2$ revolve, a beam B secured at its outer end to the platform P, the platform carrying the adjusting lever L and counterbalance springs $S_1$ $S_2$ and being supported by the steering wheel $W_3$, the steering wheel being secured to the rotatable stem $S_3$ which is controlled by the steering arm T, all as is well understood in the art. The platform is further provided with means $S_4$ for attaching thereto a suitable evener to which draft animals may be hitched. The rod $R_1$ connects the adjusting lever with the rocker $R_2$ which is pivotally connected at its lower end to the beam and at its upper end to the rods $R_3$ and $R_4$ which are in turn pivoted at their inner ends to levers $L_1$ and $L_2$. The levers $L_1$ and $L_2$ are rigidly secured to boxings $B_1$ $B_2$ which rotate about the main shaft and to brace bars $B_3$ and $B_4$, said brace bars and boxings being rigidly secured to forward extending bars $B_5$ and $B_6$, the last named bars being depressed at their forward ends and extending under the primary threshing mechanism so as to adjustably support the same and the parts closely related thereto.

The stripping device is placed at the forward end of the machine and extends at right angles to the direction of its propulsion. It is in the form of a cylinder C mounted to revolve in a suitable casing $C_1$. The casing is composed of ends E, the stationary plates $C_2$ and $C_4$, the screen $C_5$, the shield $C_6$, and has secured thereto the windboard or escape valve $C_7$. The plate $C_4$ is so formed as to provide a trough in which operates the screw conveyer $C_8$. The shield $C_6$ is supported in sliding engagement with the ends of the casing and is held in any position to which it is adjusted by means of the winged nut device $C_9$, while the windboard $C_7$ is rotatably mounted so as to be adjusted by means of the lever and rack device $C_{10}$.

The front side of the casing is open to admit the heads of grain and the blast from the air distributer D. The blast from the distributer is directed by the deflectors $D_1$ $D_2$ which are rotatably mounted in the ends of the distributer casing so as to be adjusted by means of the lever and rack devices $D_3$ and $D_4$.

Immediately back of the conveyer trough and at the left hand end thereof is an elevator $E_1$ of the usual bucket conveyer type receiving the partially threshed material from the screw conveyer. Elevator $E_1$ empties at its upper end into the casing $R_5$ of the thresher. The thresher consists of the casing $R_5$, the cylinder $R_6$, and the concave $R_7$, as common in the threshing art and delivers the material threshed into a second elevator $E_2$ which leads to the cleaning device A. The threshed material enters the cleaning chamber through the passage $A_1$, the grain passing by gravity through the descending portion $A_2$ thereof, and the chaff being discharged through the upward extending portion $A_3$ thereof, under the influence of the blast from tube $A_4$. Air is supplied to the distributer D through a pipe $D_5$ having flexible connection K therewith, and to tube $A_4$ by a pipe $D_6$ having a suitable control valve K, said pipes leading from the casing $F_2$ of the fan $F_3$. Said fan casing is supported by a suitable frame $F_4$ mounted on the main frame F. The air distributer is widely flaring from its communication with air tube $D_5$ and provided internally with diverging deflectors $D_8$ which serve to distribute the air evenly along the front of the machine. The shield $C_6$ is provided at its upper edge with an inwardly extending lip $L_3$ for purposes to be hereinafter noted.

The cylinder C is formed in two sections rigidly mounted on a common shaft $S_5$, said sections being spaced apart to permit placing upon the shaft near its middle portion the split sprocket wheel $S_6$ by which motion is communicated to the shaft and cylinder. The connecting rod $R_1$ includes a turnbuckle $T_1$ in order that the height of the front portion of the machine may be varied through a greater range than that afforded by the lever L alone.

Motion is imparted to the elevator $E_1$ by a pulley $P_1$ connected by a belt G with a smaller pulley $P_2$ on the extension of the shaft $S_5$, and the web of said elevator acts as a driving chain or belt for the screw conveyer, a pulley or sprocket wheel $P_3$ being mounted on the conveyer shaft for this purpose. From a second pulley $P_4$ on the extension of the shaft $S_5$ motion is transmitted by means of a belt $G_1$ to the pulley $P_5$ rigidly mounted on the outer end of the shaft of the cylinder $R_6$. On the inner end of last named shaft is rigidly mounted a pulley $P_6$ from which a belt $G_2$ runs over the driving pulley $P_7$ on the elevator $E_2$.

Suitably located and mounted on the frame F is a motor M for driving the entire threshing mechanism. In the present construction this motor is of the lightweight high-speed explosive type as commonly employed for the propulsion of motor vehicles. Upon one end of the shaft of the motor is mounted a pulley $P_8$ from which motion is transmitted by means of a belt $G_3$ to pulley $P_9$ on the fan. On the other end of the motor shaft is a sprocket wheel $W_4$ from which a driving chain $B_8$ transmits motion to the double sprocket wheel $W_5$ rotatably mounted upon the shaft S. The sprocket wheel $W_5$ is of the split pulley type for convenience in assembling parts and is formed with two chain receiving portions, one of which receives the chain $B_8$, the other receiving the chain $B_9$ which transmits motion to the sprocket wheel $S_6$. This double sprocket wheel and chain arrangement appears necessary in the present construction in order to permit the vertical adjustment of the front portion of the machine without interfering with the proper tension of the driving chains. Where not otherwise indicated the direction of the moving parts is indicated by arrows on the drawings.

As has been demonstrated by a practical test the operation of my device is substantially as follows: The front part of the machine being adjusted in height to correspond to the height of the grain to be harvested, the motor is started and the entire threshing mechanism is set into operation. The shield $C_6$ is adjusted to correspond to the height of the front portion of the machine and the height of the grain, the deflectors $D_1$ and $D_2$ are adjusted to suitably direct the air blast into the casing $C_1$, and the windboard is turned to leave an opening for the escape of chaff carried by the air blast. The machine is now given a forward motion through the standing grain. The sheet of air from the distributer and the upward and inward motion of the portions of the cylinder at the entrance to the casing produces an entraining action upon the air in the region of the gap between the deflector $D_2$ and the upper edge of the shield $C_6$. This causes an appreciable current of air through said gap which in connection with the forward motion of the machine brings the heads of grain within reach of the direct blast from the distributer. The direct blast drives the heads positively into the casing $C_1$ and into contact with the cylinder. By the action of the cylinder the grain is completely removed from most of the heads while those not threshed are torn from the stalks. Owing to the resistance offered by the standing straw in its attachment to the ground, it is found that a concave is not necessary in connection with the operation of this cylinder which is termed for distinction the stripping cylinder but which serves also, to a great extent, to thresh the grain from the heads. The screen $C_5$ permits the escape of a portion of the air from the blast thus preventing excessive air pressure and undesirable currents. The lip $L_3$ of the shield by deflecting inward the air set in motion by the lower portion of the cylinder aids in preventing a current of air therefrom in opposition to the incoming grain. As will be readily understood from the drawings, the screw conveyer collects the material from the primary cylinder and delivers it to the elevator $E_1$ which in turn delivers it to the thresher. The thresher is provided with a concave to suitably retard the progress of the material so that it may be thoroughly acted upon by the secondary threshing cylinder. From the thresher the material is conveyed by the elevator $E_2$ to the cleaner where it is acted upon as heretofore noted.

Attention may be called to certain features which contribute to the success of my invention in a field where others have failed. By causing the primary cylinder to rotate so that the portion engaging the standing grain moves upward, I am enabled to dispense with a concave in the connection, and the absence of the concave enables me to make the cylinder of a lighter construction and to place the teeth closer together and in staggered arrangement so that no grain which enters the casing can escape their action. The combined action of the direct and entrained air currents has proved very effective in directing the grain into the threshing device, while the opening afforded by the adjustment of the windboard permits the escape of a large amount of waste matter. The gasolene engine as now developed and employed affords ample power for the threshing operations without rendering the machine unwieldly because of excessive weight, and without depending upon the tractive force of drive-wheels upon the ground. The combination of the stripping cylinder of light construction with an ordinary threshing device enables me to greatly reduce the length of the concave and heavy cylinder coöperating therewith, thus materially reducing the weight of the machine and at the same time rendering the threshing action more effective.

I claim:

1. In a standing-grain thresher and in combination, a stripping device adapted to receive the heads of standing grain, a blast distributer provided with a discharge aperture in advance of said stripping device and directed toward the same adapted and arranged to direct a blast against said heads in the direction of their entrance into said stripping device, means for changing the angle of elevation of said blast, a casing and means for creating pneumatic pressure therein, and a conduit leading from said casing to said distributer.

2. In a standing-grain thresher and in combination, a stripping device, a blast distributer having a discharge aperture arranged substantially in advance of said stripping device, directed toward the same and spaced therefrom, the space between said distributer and stripping device being adapted to receive the heads of standing grain, the distributer being adapted to direct the blast against said heads and toward the stripping device so as to entrain a rising current of air; and means for supplying a blast to the distributer.

3. In a standing-grain thresher, a stripping device, a blast creating device, and a blast distributing device having a discharge aperture in advance of the stripping device and directed toward the same, said stripping device comprising a casing adapted to receive the heads of standing grain, and a stripping cylinder rotatably mounted therein; said discharge aperture being directed toward the upper part of said cylinder and said blast distributing device being formed and arranged to direct a blast through said grain and toward the cylinder throughout its length so as to entrain a current of air from without.

4. In a standing-grain thresher, the combination of a stripping device arranged and adapted to receive the heads of standing grain, and a blast creating and distributing device; the stripping device comprising a casing and stripping cylinder rotatably mounted therein, the casing provided in its upper portion with a screen, at its upper rear portion with an escape valve and at its lower front portion with an adjustable shield; the blast creating and distributing device being formed and arranged to direct the blast against the grain and toward said cylinder throughout its length, and in such direction as to entrain a portion of the outside air.

5. In a device of the class described, the combination with a frame, of a rotary stripper, a shield below and in front of said stripper adapted to permit the heads of standing grain to pass over it to said stripper, means for creating an air current to carry said heads of grain to said stripper, and means for rotating said stripper in such direction that its forward side striking said heads moves upward.

6. In a standing grain thresher, the combination with a movable frame, of a rotary stripper carried thereby adapted to receive the heads of standing grain, means for so rotating the stripper that its forward side in contact with the heads will move upward, and means for directing the heads of the grain against the upper portion of the upwardly moving side of said stripper.

7. In a standing grain thresher, the combination with a rotary stripper adapted to engage the heads of grain by an upward stroke, a shield extending from the lower part of said stripper around toward the front over which the heads pass, and means in advance of said stripper for directing a blast of air thereto above said shield whereby the heads will be forced against the stripper.

8. In a standing grain thresher, the combination with a casing open at one side to receive the heads of grain, of a stripping cylinder therein horizontally at the rear margin of said opening, means for so rotating said cylinder that its forward side will move upward, a blast distributer in advance of said cylinder extending substantially the length of said cylinder and discharging across said opening against the upper half of said cylinder, and means for creating a blast of air from said distributer.

9. In a standing grain thresher, the combination with a casing open at one side to receive the heads of grain, of a stripping cylinder therein horizontally at the rear margin of said opening, means for so rotating said cylinder that its forward side will move upward, a blast distributer in advance of said cylinder extending substantially the length of said cylinder and discharging across said opening against the upper half of said cylinder, and means for creating a blast of air from said distributer, a deflecting plate at the discharge opening of said distributer controlling the direction of the blast.

10. In a standing grain thresher, the combination with a casing open at the front, of a stripping cylinder across said casing along the margin of said opening at the bottom and extending toward the top, a shield extending from the bottom upwardly around the front side of said cylinder for approximately half its height, a blast distributer in advance of said cylinder discharging across said opening against said cylinder above said shield, and means for creating an air blast from said distributer.

11. In a standing grain thresher, the combination with a casing open at the front, of a stripping cylinder across said casing along the margin of said opening at the bottom and extending toward the top, a semi-cylindrical shield extending from the bottom upwardly around the front side of said cylinder for about half its height, said shield having an inturned lip or flange at its upper edge, means for adjusting the height of said shield around said cylinder, a blast distributer in advance of said cylinder discharging across said opening against said cylinder above said shield, and means for creating an air blast from said distributer.

12. In a device of the class described, the combination with a casing having an opening in its forward side to receive the heads of standing grain, of a blast distributer in advance of said opening directed therein above the lower margin of said opening, means for creating a blast of air from said distributer, and stripping mechanism within said casing adjacent said opening whereby the said blast will draw air upwardly into said opening and the heads of grain will be lifted and positively driven into said opening against said stripping mechanism.

13. In a device of the class described, the combination with a casing having an opening in its forward side to receive the heads of standing grain, of a blast distributer in advance of said opening directed therein above the lower margin of said opening, means for creating a blast of air from said distributer, stripping mechanism within said casing adjacent said opening having an upward stroke, means for permitting the escape of air and chaff along the upper rear portion of said casing, and means for collecting and conveying the grain along the lower portion thereof.

14. In a device of the class described, the combination with a casing having an opening in its forward side to receive the heads of standing grain, of a stripping cylinder within said casing, a blast distributer having a narrow elongated discharge opening substantially the length of said cylinder in advance of said cylinder discharging into said opening in said casing, means for creating air pressure, and pipe connection from said pressure means to said distributer including a flaring portion having therein diverging partitions to distribute the air.

15. In a device of the class described, the combination with a casing having an opening in its forward side to receive the heads of standing grain, of a blast distributer in advance of said opening directed therein above the lower margin of said opening, means for creating a blast of air from said distributer, stripping mechanism within said casing adjacent said opening, a perforated screen along the top of said casing in the rear of said opening to permit the escape of air, an adjustable windboard in the rear upper portion of said casing to permit the escape of chaff, and means at the bottom of said casing to collect the grain.

16. In a device of the class described, the combination with an elongated casing open at one side to receive the heads of standing grain, of a stripping cylinder within said casing extending along said opening, the casing being provided with a foraminous section above said cylinder to permit the escape of air, a windboard in the rear of said section to permit the escape of air and trash, a conveyer along the floor of said casing at the rear of said cylinder, an elevator at the end of said conveyer, and means for discharging a blast of air into said casing through said opening.

17. In a standing grain thresher, the combination with a main frame mounted on wheels, of a fixed casing mounted on said frame, threshing mechanism in said casing, an elongated vertically adjustable casing across said thresher in advance of said threshing mechanism having an opening adapted to receive the heads of standing grain, means carried by said adjustable casing for stripping the heads from the standing stalks of grain and partially separating the chaff and trash from the grain and discharging said chaff and trash, means for collecting the grain in said adjustable casing and conveying it to said threshing mechanism, and means for separating chaff and trash from said grain after it has passed through said threshing mechanism.

18. In a standing grain thresher, the combination with a main frame mounted on wheels, of means thereon for threshing and separating grain, a vertically adjustable casing supported by said frame and having an opening adapted to receive the heads of standing grain, stripping mechanism within said adjustable casing, an air blast distributer having a discharge aperture substantially in advance of said stripping mechanism and discharging into said opening, a blast creating device on the said frame, flexible connection between said blast creating device and distributer, and means for collecting the grain in said adjustable casing and conveying it to the threshing means.

19. In a device of the class described, the combination with a main frame mounted on an axle carried by wheels, of threshing mechanism, separating mechanism and blast creating mechanism mounted on said frame, a motor mounted on said frame provided with connections for operating said mechanisms, an elongated casing in advance of said wheels and main frame, adapted to receive the heads of standing grain, means therein for stripping said heads, means for conducting a blast from said blast creating mechanism to said stripping mechanism, means for separating from the grain the chaff released by said stripper, means for conveying the grain from said stripper to said thresher, and means on said main frame for adjustably supporting said casing at different elevations.

20. In a device of the class described, the combination with a main frame mounted on wheels, of threshing and separating mechanism thereon, a light elongated casing extending across said machine in advance of said main frame and wheels, means in said casing for stripping and partially threshing the heads of standing grain and for partially separating the chaff from the grain, means for conveying said stripped grain to said threshing mechanism, and means on said main frame for adjustably supporting said casing at different elevations.

21. In a device of the class described, the combination with a main frame mounted on wheels, of threshing and separating mechanism thereon, a light elongated casing extending across said machine in advance of said main frame and wheels, means in said casing for stripping and partially threshing the heads of standing grain and for partially separating the chaff from the grain, means for conveying said stripped grain to said threshing mechanism, means on said main frame for adjustably supporting said casing at different elevations, a motor carried by said frame, and connecting means from said motor to said threshing mechanism, said stripper and said conveying means for operating the same.

22. In a standing grain thresher, the combination with a rotary stripper adapted to engage the heads of grain by an upward stroke, a shield extending from the lower part of said stripper around toward the front over which the heads pass, and means for creating a current of air above said shield toward said stripper whereby the heads will be forced against the stripper.

23. In a standing grain thresher, the combination with a movable frame, of a rotary stripper carried thereby adapted to receive the heads of standing grain, means for so rotating the stripper that its forward side in contact with the heads will be moved upward, and means for creating a current of air toward and over said stripper whereby the heads of grain will be carried against the upwardly moving side of said stripper.

24. In a standing grain thresher, the combination with a movable frame, of a rotary stripper carried thereby adapted to receive the heads of standing grain, means for so rotating the stripper that its forward side in contact with the heads will move upward, and means acting in opposition to the motion of said stripper for forcing the heads of the grain against said stripper.

25. In a standing grain thresher, the combination with a casing having an opening in its forward side to receive the heads of standing grain, of stripping mechanism within said casing adjacent said opening striking said heads with an upward stroke, means for causing a current of air to flow into said casing over said stripping mechanism whereby the heads of grain will be forcibly carried against said mechanism, means for permitting the escape of air and chaff from said casing in the rear of said stripping mechanism, and means for collecting and conveying the separated grain.

26. In a standing grain thresher, the combination with a casing having an opening in its forward side to receive the heads of standing grain, of a stripping cylinder within said casing adjacent said opening, means for so rotating the cylinder that its forward side in contact with the heads will move upward, means for causing a current of air to flow into said casing over said cylinder whereby the heads of grain will be forcibly carried against the cylinder, means for permitting the escape of air and chaff from said casing in the rear of said cylinder, and means for collecting and conveying the separated grain.

CURTIS C. BALDWIN.

Witnesses:
JUNE M. HULL,
FRED NEWTON.

---

Copies of this patent may be obtained for five cents each, by addressing the "Commissioner of Patents, Washington, D. C."